(12) United States Patent
Tamura et al.

(10) Patent No.: US 9,268,067 B2
(45) Date of Patent: Feb. 23, 2016

(54) OPTICAL COMPONENT HAVING ANTIREFLECTION STRUCTURE

(71) Applicant: PANASONIC CORPORATION, Osaka (JP)

(72) Inventors: Takamasa Tamura, Osaka (JP); Kazuhiro Yamada, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 430 days.

(21) Appl. No.: 13/765,111

(22) Filed: Feb. 12, 2013

(65) Prior Publication Data
US 2013/0148206 A1    Jun. 13, 2013

Related U.S. Application Data

(63) Continuation of application No. PCT/JP2012/001109, filed on Feb. 20, 2012.

(30) Foreign Application Priority Data

Feb. 22, 2011 (JP) ................ 2011-035663

(51) Int. Cl.
   *G02B 1/118* (2015.01)

(52) U.S. Cl.
   CPC .................... *G02B 1/118* (2013.01)

(58) Field of Classification Search
   CPC . G02B 1/10; G02B 1/11–1/113; G02B 1/118; G02B 5/02–5/0221; G02B 5/0231; G02B 5/0263; G02B 5/0278; G02B 5/0294
   USPC ........ 359/580–581, 599, 601, 613, 614, 707; 349/112, 137; 348/834; 362/606–607, 362/617–620
   See application file for complete search history.

(56) References Cited

U.S. PATENT DOCUMENTS

| 2005/0088746 A1 | 4/2005 | Yoshikawa et al. |
| 2007/0144700 A1* | 6/2007 | Kobayashi et al. ............ 164/14 |
| 2007/0242350 A1 | 10/2007 | Endo |

(Continued)

FOREIGN PATENT DOCUMENTS

| JP | 2002-267815 A | 9/2002 |
| JP | 2005-157325 A | 6/2005 |
| JP | 2005-283814 A | 10/2005 |
| JP | 2007-127855 A | 5/2007 |

(Continued)

OTHER PUBLICATIONS

International Search Report issued in International Patent Application No. PCT/JP2012/001109 mailed on Apr. 17, 2012.

*Primary Examiner* — Stephone B Allen
*Assistant Examiner* — James McGee
(74) *Attorney, Agent, or Firm* — McDermott Will & Emery LLP

(57) ABSTRACT

A lens includes a plurality of raised portions and recessed portions in an arrangement, and includes an antireflection structure. The antireflection structure includes an area where a height of each of the raised portions is relatively low and a depth of each of the recessed portions is relatively shallow, and an area where a height of each of the raised portions is relatively high and a depth of each of the recessed portions is relatively deep. In the area where the height of each of the raised portions is relatively low and the depth of each of the recessed portions is relatively shallow, first and second flat surfaces are respectively provided at a top portion of the raised portion and a bottom portion of the recessed portion.

7 Claims, 7 Drawing Sheets

(56) References Cited

U.S. PATENT DOCUMENTS

| | | |
|---|---|---|
| 2008/0180824 A1* | 7/2008 | Endoh et al. .................. 359/894 |
| 2009/0190225 A1 | 7/2009 | Yamada et al. |
| 2009/0257127 A1 | 10/2009 | Okayama et al. |
| 2010/0172027 A1 | 7/2010 | Yamada et al. |
| 2010/0271706 A1 | 10/2010 | Yamada et al. |

FOREIGN PATENT DOCUMENTS

| | | |
|---|---|---|
| JP | 2008-012690 A | 1/2008 |
| JP | 2009-198628 A | 9/2009 |
| WO | WO-2005/092588 A1 | 10/2005 |
| WO | WO-2007/018149 A1 | 2/2007 |
| WO | WO-2007/142186 A1 | 12/2007 |

* cited by examiner

FIG.3
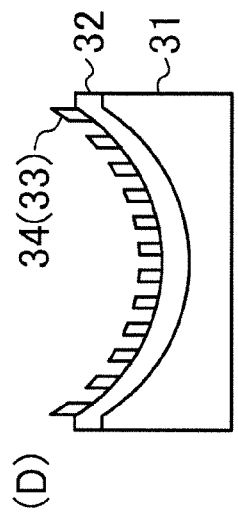
(A)
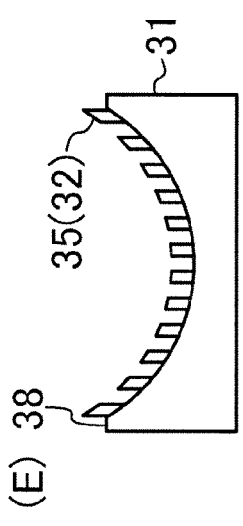
(B)
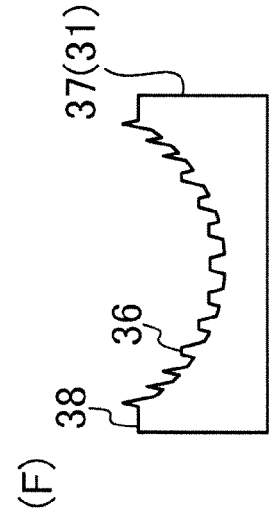
(C)
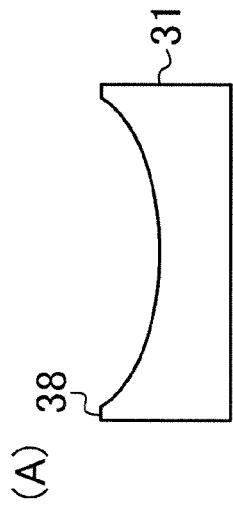
(D)
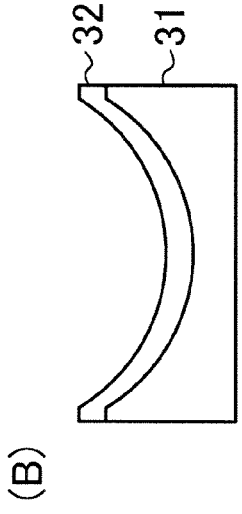
(E)
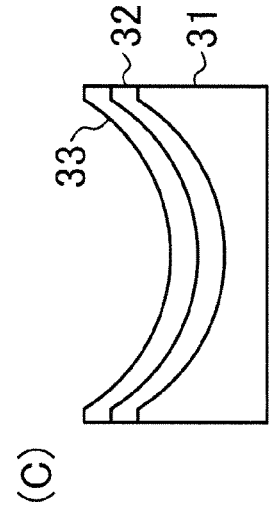
(F)

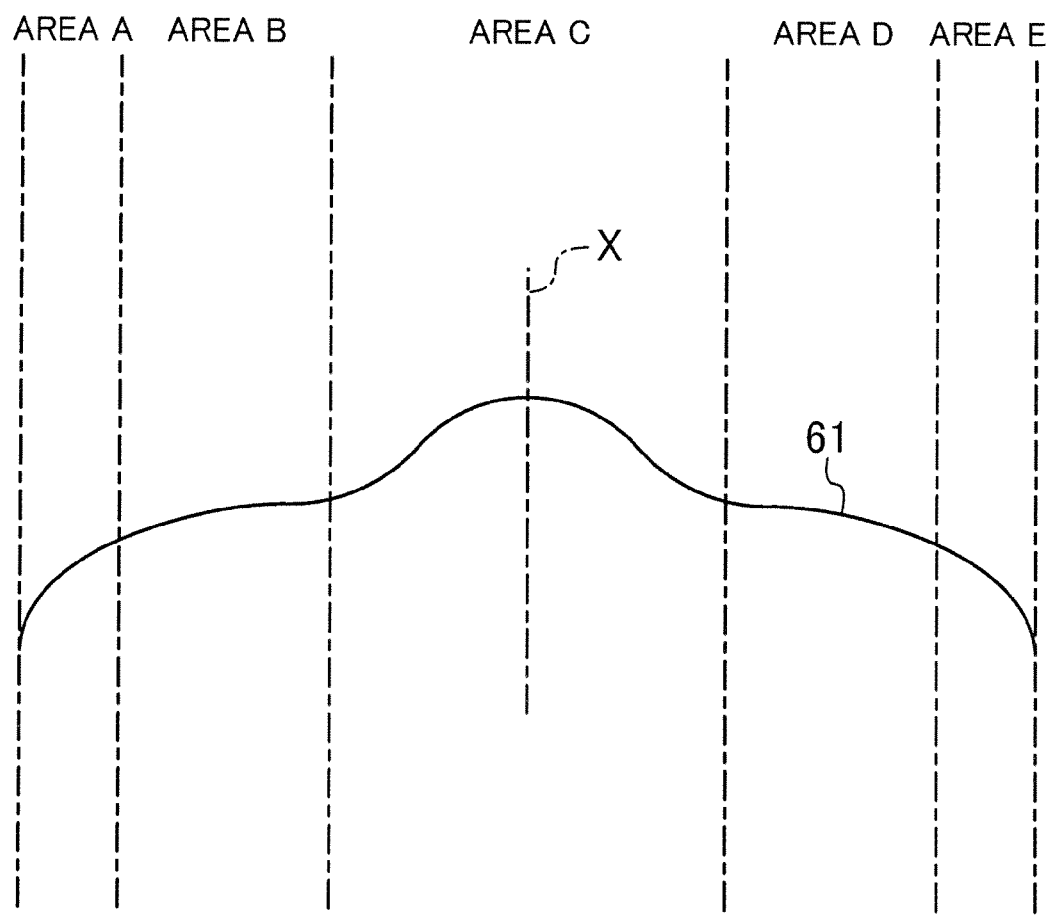

OPTICAL COMPONENT HAVING ANTIREFLECTION STRUCTURE

CROSS-REFERENCE TO RELATED APPLICATION

This is a continuation of PCT International Application PCT/JP2012/001109 filed on Feb. 20, 2012, which claims priority to Japanese Patent Application No. 2011-035663 filed on Feb. 22, 2011. The disclosures of these applications including the specifications, the drawings, and the claims are hereby incorporated by reference in their entirety.

BACKGROUND

The techniques disclosed herein relate to optical components. The techniques disclosed herein particularly relate to optical components whose surface is provided with an antireflection structure for reducing reflection of incident light.

In recent years, various types of optical components whose surface is provided with an antireflection treatment for reducing light reflection have been suggested.

Examples of the antireflection treatment include forming fine structures on a surface of the optical component with a pitch equal to or smaller than the wavelength of the incident light. For example, the fine structures may be made of linear raised portions or linear recessed portions which are periodically arranged, or may be made of cone-shaped or columnar raised portions, or funnel-shaped or cylindrical recessed portions which are periodically arranged. Hereinafter, a structure in which a plurality of such fine structures are arranged may be referred to as a "antireflection structure" or a "subwavelength structure (SWS)."

For example, Japanese Patent Publication No. 2005-283814 discloses an optical element in which the asperities of the antireflection structure are arranged in a descending order of depth toward the outer periphery.

SUMMARY

However, the antireflection effect varies depending on the height and the depth of the fine structure. Thus, if the height of the fine structure is reduced, the antireflection properties may also be reduced.

The present disclosure is made in view of the above problem, and it is an objective of the invention to improve antireflection properties of an antireflection structure in which fine structures have different heights or different depths according to locations.

An optical component of the present disclosure includes at least one curved surface on which an antireflection structure including a plurality of structure units periodically arranged, and which reduces reflection of light whose wavelength is equal to or greater than a cycle (a pitch) of the structure units, is formed. The antireflection structure includes an area where a height of each of the structure units is relatively low, and an area where the height of each of the structure units is relatively high. In the area where the height of each of the structure units is relatively low, a substantially flat surface is provided at each of an upper surface and a lower surface of the antireflection structure.

In the present disclosure, a substantially flat surface is provided at each of the upper surface and the lower surface of the antireflection structure in the area where the height of each of the structure units is low. Light interference may occur at the substantially flat upper and lower surfaces. The antireflection effects in the area where the heights of the structure units are low can be enhanced by utilizing the light interference. As a result, it is possible to enable an antireflection structure in which the heights of fine structures are different according to locations to have antireflection properties superior to the antireflection properties of conventional structures.

BRIEF DESCRIPTION OF THE DRAWINGS

FIG. 3 shows steps for forming a mold of a lens.

FIG. 7 is a schematic drawing for showing a base surface of a first optical surface of the third embodiment.

DETAILED DESCRIPTION

Embodiments will be described below with reference to the drawings.

<<First Embodiment>>

[General Description of Lens]

Figure 1:
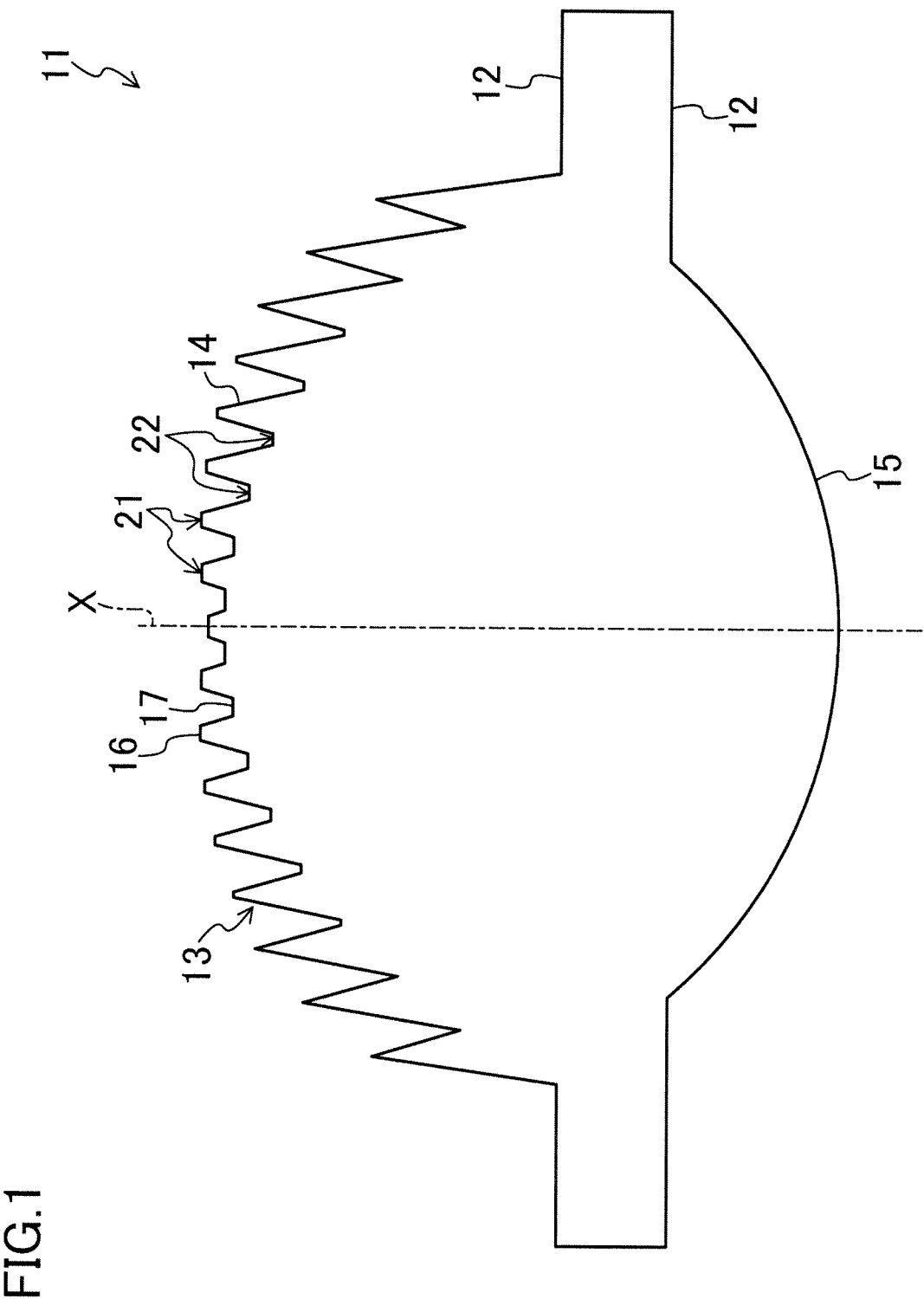
FIG. 1 is a cross section of a lens according to the first embodiment.

FIG. 1 is a cross section of a lens 11 according to the first embodiment.

The lens 11 of the first embodiment includes an antireflection structure. The lens 11 is an example optical component. The lens 11 includes a first optical surface 14, a second optical surface 15, and cut end surfaces 12. The first optical surface 14 and the second optical surface 15 face each other. The cut end surfaces 12 are formed at outer peripheries of the first and second optical surfaces 14, 15, and connected to outer periphery edges of the first and second optical surface 14, 15. The first optical surface 14 is provided with an antireflection structure (hereinafter also referred to as SWS) 13.

The SWS 13 includes a plurality of raised portions 21 and recessed portions 22 which are alternately arranged, and reduces reflection of light whose wavelength is equal to or greater than a cycle of the raised portions 21 and a cycle of the recessed portions 22. In other words, the SWS 13 includes a plurality of structure units (the raised portions or the recessed portions) which are periodically arranged, and reduces reflection of light whose wavelength is equal to or greater than a cycle of the structure units. Specifically, the SWS 13 reduces reflection of light by gradually changing a refractive index from the tip of the raised portion 21 to the bottom portion of the recessed portion 22. Each of the raised portions 21 is in a substantially cone shape. Each of the recessed portions 22 is in a substantially funnel shape. It is preferable to set the cycle of the raised portions 21 or the cycle of the recessed portions 22 to a value obtained by dividing the wavelength of light incident on the lens 11 by the refractive index of the lens 11, or less. Further, the height of the raised portion 21 or the depth of the recessed portion 22 is preferably 0.4 times or more the wavelength of light incident on the lens 11. If these conditions are satisfied, it is possible to exert a sufficient antireflection effect. Here, the height of the raised portion 21 is a distance from a curved surface passing through the bottom portions of the recessed portions 22 (hereinafter also referred to as a lower base surface) to a top portion of the raised portion 21 in a direction of an optical axis X of the lens 11 (hereinafter also referred to as an optical axis direction). The depth of the recessed portion 22 is a distance from a curved surface passing through the top portions of the raised portions 21 (hereinafter also referred as an upper base surface) to the bottom portion of the recessed portion 22 in the optical axis direction. The cycle of the raised portions 21 is a distance between the top portions of adjacent raised portions 21 in a direction parallel to a surface orthogonal to the optical axis X. The cycle of the recessed portions 22 is a distance between the bottom portions of adjacent recessed portions 22 in a direction parallel to a surface orthogonal to the optical axis X. Since the raised portions 21 and the recessed portions 22 are alternately arranged, the height of the raised portion 21 and the depth of the recessed portion 22 are approximately the same, and the cycle of the raised portions 21 and the cycle of the recessed portions 22 are approximately the same. For example, to reduce reflection of visible light (whose wavelength is about 400-700 nm) incident on the lens 11 having a refractive index of 1.5, the cycle of the raised portions 21 or the recessed portions 22 is set to about 266 nm or less, and the height of each of the raised portions 21 or the depth of each of the recessed portions 22 is set to about 280 nm or more, for sufficient antireflection effect.

The heights of the raised portions 21 or the depths of the recessed portions 22 are not uniform across the first optical surface 14. That is, the heights of the raised portions 21 or the depths of the recessed portions 22 are different depending on locations. For example, a curved surface of a lens etc. has different inclination with respect to the optical axis X, depending on locations. Thus, it is difficult to make the heights of the raised portions 21 or the depths of the recessed portions 22 uniform in the case where the SWS 13 is provided on the curved surface. In the SWS 13 according to the present embodiment, the heights of the raised portions 21 are relatively high around a perimeter portion of the first optical surface 14, and the heights of the raised portions 21 are relatively low in a central portion of the first optical surface 14. Specifically, in the SWS 13, the raised portions 21 are arranged in an ascending order of height toward the perimeter portion of the first optical surface 14, and in a descending order of height toward the central portion of the first optical surface 14. The perimeter portion of the first optical surface 14 is an example of the area where a height of each of the raised portions 21 is relatively high. The central portion of the first optical surface 14 is an example of the area where a height of each of the raised portions 21 is relatively low.

[Detailed Structure of SWS]

Figure 2:
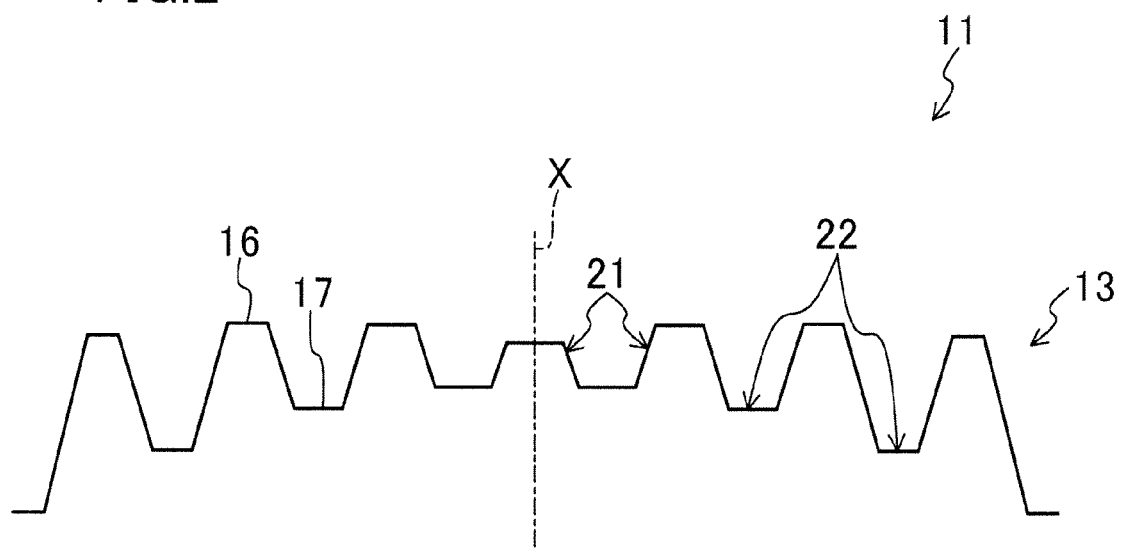
FIG. 2 is an enlarged view of part of an antireflection structure of the first embodiment.

FIG. 2 is an enlarged cross section of the center portion of the antireflection structure 13 of the lens 11. In the center portion of the first optical surface 14, the top portion of the raised portion 21 has a first flat portion 16, and the bottom portion of the recessed portion 22 has a second flat portion 17. In the perimeter portion of the first optical surface 14, the top portions of the raised portions 21 and the bottom portions of the recessed portions 22 are sharp without a flat portion, as shown in FIG. 1. These first and second flat portions 16, 17 form a flat surface.

In the present embodiment, the first and second flat portions 16, 17 are approximately orthogonal to the optical axis X. That is, the first and second flat portions 16, 17 are approximately parallel to each other. The first and second flat portions 16, 17 are in an approximately circular shape. The areas of the first and second flat portions 16, 17 are increased with decreasing distance between each of the first and second flat portions 16, 17 and the center of the first optical surface 14. That is, the areas of the first and second flat portions 16, 17 are increased as the heights of the raised portions 21 are reduced, and as the depths of the recessed portions 22 are reduced. The first and second flat portions 16, 17 do not have to be strictly flat, but may be substantially flat.

In the case where the first and second flat portions 16, 17 are provided, a portion of the first flat portion 16 which is farthest from the lower base surface in the optical axis direction is considered to be the top portion of the raised portion 21, and a portion of the second flat portion 17 which is farthest from the upper base surface in the optical axis direction is considered to be the bottom portion of the recessed portion 22, to identify the lower base surface, the upper base surface, the height of the raised portion 21, the cycle of the raised portions 21, the depth of the recessed portion 22, and the cycle of the recessed portions 22. In the case where the first and second flat portions 16, 17 are approximately orthogonal to the optical axis X as in the present embodiment, the center of the first flat portion 16 is considered to be the top portion of the raised portion 21, and the center of the second flat portion 17 is considered to be the top portion of the recessed portion 22. For example, the lower base surface is a curved surface passing through the bottom portion if the recessed portion 22 does not have the second flat portion 17, or passing through the center of the second flat portion 17 if the recessed portion 22 has the second flat portion 17. The height of the raised portion 21 is a distance from the lower base surface to the center of the first flat portion 16 in the optical axis direction. The cycle of the raised portions 21 is a distance between the centers of the first flat portions 16 of adjacent raised portions 21 in a direction parallel to a surface orthogonal to the optical axis X.

The first and second flat portions 16, 17 provided in this manner enable an increase in the antireflection effect on the entire first optical surface 14. Specifically, it is preferable that the raised portions 21 are high and the recessed portions 22 are deep in terms of the antireflection effect. The antireflection effect of the area where the heights of the raised portions 21 are low, or the depths of the recessed portions 22 are shallow, is smaller than the antireflection effect of the area where the heights of the raised portions 21 are high, or the depths of the recessed portions 22 are deep. Here, if the first and second flat portions 16, 17 are provided, the refractive index is significantly changed at the first and second flat portions 16, 17, and therefore, part of light incident on the first and second flat portions 16, 17 is reflected. However, since both of the raised portion 21 and the recessed portion 22 are provided with the flat portions, the light reflected on the first flat portion 16 and the light reflected on the second flat portion 15 interfere with each other and become weaker. As a result, the light reflection on the first optical surface 14 as a whole is reduced. This means that even the portion which inherently exerts relatively small antireflection effect can reduce reflection of light by utilizing the light interference effect.

[Fabrication Method]

Now, a method for forming the lens 11 will be described. The lens 11 is formed by molding using a lens mold. The lens mold has an inverted shape of the SWS 13. If glass is used as the material for the lens 11, the lens 11 is formed by, for example, heat press molding. If resin is used as the material for the lens 11, the lens 11 is formed by, for example, injection molding or UV molding.

Next, fabrication of the lens mold used for molding will be described. FIG. 3 shows the steps for forming a lens mold 37.

First, a mold base 31 is prepared. Then, as shown in FIG. 3A, a lens shape (a state before formation of the SWS 13) is formed on the mold base 31 by machine processing.

Next, as shown in FIG. 3B, a metal mask 32 is formed on the surface of the mold base 31 having the lens shape. It is preferable to use a sputtering method, a evaporation method, etc., as a method for forming the metal mask 32.

Next, as shown in FIG. 3C, a resist mask 33 is formed on the metal mask 32. It is preferable to use a spin coating method, a spray coating method, etc., as a method for forming the resist mask 33.

Next, as shown in FIG. 3D, a resist dot pattern 34 corresponding to the SWS 13 is formed in the resist mask 33. It is preferable to use electron beam lithography, interference exposure (hologram exposure), etc., as the method for forming the resist dot pattern 34. Further, the diameters of the holes of the resist dot pattern 34 are preferably uniform throughout the surface.

Next, as shown in FIG. 3E, the resist dot pattern 34 is transferred to the metal mask 32 by dry etching. As a result, a metal mask dot pattern 35 is formed. Wet etching may also be used as a method for forming the metal mask dot pattern 35.

Next, as shown in FIG. 3F, the metal mask dot pattern 35 is transferred to the mold base 31 by dry etching. As a result, the lens mold 37 having the inverted shape 36 of the SWS 13 on the surface of the mold base 31 is obtained.

In general, the plasma (ions) generated in the dry etching device is concentrated on a projection or a pointed portion of the object being processed. The plasma (ions) is easily concentrated on an edge portion 38 of the mold base 31 when the mold base 31 is dry etched during the process. Thus, the edge portion 38, on which the plasma is concentrated, is etched faster than the center portion is etched. If the dry etching is performed using the resist dot pattern 34 having uniform-diameter holes as shown in FIG. 3D, the heights of the raised portions are high and the recessed portions are deep at the perimeter portion of the mold base 31 because the etching speed is high, whereas the raised portions are low and the recessed portions are shallow at the center portion of the mold base 31 because the etching speed is low. By controlling the etching time, it is possible to maximize the heights of the raised portions and the depths of the recessed portions at the perimeter portion of the mold base 31, while maintaining the flat portions at the top portions of the raised portions and the bottom portions of the recessed portions at the center portion of the mold base 31.

As a result of the process, the raised portions are high and the recessed portions are deep at the perimeter portion of the lens mold 37, and the heights of the raised portions and the depths of the recessed portions are reduced with decreasing distance between each of the raised portions and the recessed portions and the center portion of the lens mold 37. Further, flat portions are formed at the top portions of the raised portions and the bottom portions of the recessed portions at the center portion of the lens mold 37.

[Advantages]

According to the above embodiment, the lens 11 includes a plurality of arranged raised portions 21 and recessed portions 22, and includes an antireflection structure 13 for reducing reflection of light whose wavelength is equal to or greater than the cycle of the raised portions 21 and the cycle of the recessed portions 22. The antireflection structure 13 has an area where the raised portions 21 are relatively low and the recessed portions 22 are relatively shallow, and an area where the raised portions 21 are relatively high and the recessed portions 22 are relatively deep. In the area where the raised portions 21 are relatively low and the recessed portions 22 are relatively shallow, the first and second flat portions 16, 17 are respectively formed at the top portion of the raised portion 21 and the bottom portion of the recessed portion 22.

In other words, the lens 11 is an optical component which includes at least one curved surface on which an antireflection structure is provided, the antireflection structure including a plurality of structure units which are periodically arranged to reduce reflection of light whose wavelength is equal to or greater than a cycle of the structure units. The antireflection structure includes an area where the heights of the structure units are relatively low, and an area where the heights of the structure units are relatively high. Substantially flat portions are formed at an upper surface and a lower surface of the antireflection structure in the area where the heights of the structure units are relatively low.

In the above configuration, the antireflection effects of the raised portions 21 and the recessed portions 22 themselves are relatively small in the area where the raised portions 21 are relatively low and the recessed portions 22 are relatively shallow. However, it is possible to increase the antireflection effect by forming the first flat portion 16 at the top portion of the raised portion 21 and forming the second flat portion 17 at the bottom portion of the recessed portion 22, and utilizing an interference effect between the light reflected on the first flat portion 16 and the light reflected on the second flat portion 17. As a result, the antireflection effect can be entirely increased even in a structure which includes both of the area where the raised portions 21 are relatively low and the recessed portions 22 are relatively shallow, and the area where the raised portions 21 are relatively high and the recessed portions 22 are relatively deep. Further, it is possible to easily form the antireflection structure 13 by making the raised portions 21 low and the recessed portions 22 shallow. That is, in the area where it is requested to form the antireflection structure 13 easily, the raised portions 21 are made low and the recessed portions 22 are made shallow, and the first and second flat portions 16, 17 are formed at the top portion of the raised portion 21 and the bottom portion of the recessed portion 22, thereby making it possible to increase the easiness in forming the antireflection structure 13, and reduce degradation of the antireflection effect. As a result, it is possible to achieve both the easiness in forming the antireflection structure 13, and the improvement in the antireflection effect which have not been achieved.

Further, the lower the raised portions 21, or the shallower the recessed portions 22 are, the larger the first and second flat portions 16, 17 are.

As the raised portions 21 become lower, or the recessed portions 22 become shallower, the antireflection effects of the raised portions 21 and the recessed portions 22 themselves become smaller. In view of this, the area of the first flat portion 16 is increased as the raised portions 21 become lower, and the area of the second flat portion 17 is increased as the recessed portions 22 become shallower. As a result, it is possible to increase the antireflection effect due to interference.

EXAMPLES

Examples will be described below. The lens in the following examples corresponds to the lens 11 of the first embodiment.

Example

The following lens was formed as an example. A lens was formed by injection molding using a lens mold, using cyclic olefin polymer (e.g., ZEONEX (a registered trademark) produced by ZEON CORPORATION, ARTON (a registered trademark) produced by JSR Corporation, APEL (a registered trademark) produced by Mitsui Chemicals, Inc., etc.) as a lens material.

For the lens mold 37, silicon carbide (SiC) was prepared as the mold base 31. A lens shape was formed on the mold base 31 by machine processing. Tungsten silicide (WSi) was formed by a sputtering method. Then, an electron-beam resist (a positive resist) was applied by a spin coating method. After that, a dot pattern was drawn by electron beam lithography.

Using the resist dot pattern as a mask, a dot pattern was formed in the WSi mask by dry etching using argon gas. After that, an inverted shape of the SWS was formed on the SiC surface of the mold base 31 by dry etching using fluorocarbon gas.

The thus-formed lens mold 37 was immersed in a fluorine based mold release agent, and was subjected to a release treatment. The lens was formed by injection molding using the lens mold 37 subjected to the release treatment.

The obtained lens 11 is a biconvex lens whose effective diameter is 16 mm, and whose thickness is 2.4 mm.

The cycle of the raised portions 21 and the cycle of the recessed portions 22 of the lens 11 used in the example are 250 nm on the entire first optical surface 14. The height of the raised portion 21 and the depth of the recessed portion 22 are 350 nm at a perimeter portion of the lens 11, and 210 nm at a center portion of the lens 11. That is, the heights are gradually reduced with decreasing distance between the raised portion 21 and the center portion of the lens 11. Further, first and second flat portions 16, 17 were respectively formed at the top portion of the raised portion 21 and the bottom portion of the recessed portion 22 at the center portion of the lens 11. The outer diameter of the first flat portion 16 at the center portion of the lens 11 is about 60 nm. The areas of the first and second flat portions 16, 17 are reduced with decreasing distance between each of the first and second flat portions 16, 17 and the perimeter portion of the lens 11.

COMPARATIVE EXAMPLE

As a comparative example, a lens not having the first and second flat portions 16, 17 was formed. Specifically, in the lens according to the comparative example, the raised portion 21 is not provided with the first flat portion 16 and is sharp, and the recessed portion 22 is not provided with the second flat portion 17 and is sharp, different from the lens according to the example. Although the cycle of the raised portions 21 and the cycle of the recessed portions 22 are the same in the comparative example and the example, the raised portions 21 are higher and the recessed portions 22 are deeper in the comparative example because the first and second flat portions 16, 17 are not provided in the comparative example. Even so, the raised portions 21 are lower and the recessed portions 22 are shallower at the center portion than at the perimeter portion of the lens according to the comparative example. The other structures of the lens of the example and the lens of the comparative example are similar to each other.

<Measurement Result>

Figure 4:
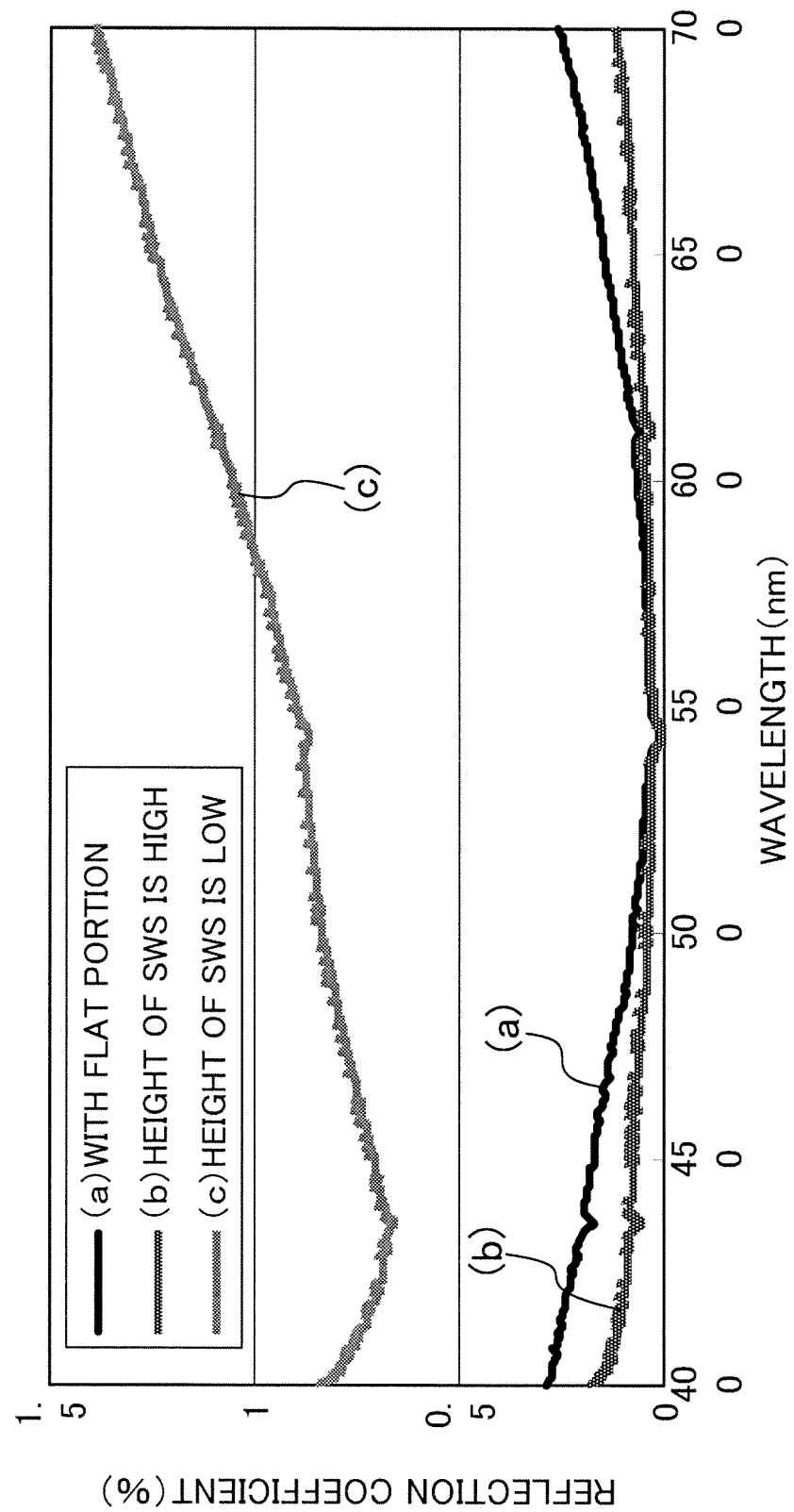
FIG. 4 is a graph for showing a relationship between a wavelength and a reflection coefficient in Example.

FIG. 4 shows the result of measurement of reflection coefficients of the surfaces of the lenses according to the example and the comparative example. The reflection coefficients were measured using an optical measuring device USPM-RU III produced by Olympus Corporation. The reflection coefficients of the lenses of the example and the comparative example were measured using BK7, which is a general optical glass, as a reference. Specifically, an object to be measured (i.e., the lens in the example or the lens in the comparative example) and a reference were set on the optical measuring device, and the object to be measured and the reference were irradiated with light having a wavelength of 400 to 700 nm, and reflection coefficients were measured.

The graph in FIG. 4 shows the reflection coefficients of the lenses of the example and the comparative example which correspond to respective wavelengths. In FIG. 4, the abscissa axis indicates a wavelength, and the ordinate axis indicates a reflection coefficient. The graph (a) and the graph (b) show the reflection coefficients of the lens of the example. Specifically, the graph (a) indicates the reflection coefficient of an area of the lens 11 of the example in which the raised portions 21 are low and the recessed portions 22 are shallow, and in which flat portions are provided at the top portion of the raised portion 21 and at the bottom portion of the recessed portion 22. The graph (b) indicates the reflection coefficient of an area of the lens 11 of the example in which the raised portions 21 are high and the recessed portions 22 are deep. On the other hand, the graph (c) indicates the reflection coefficient of an area of the lens of the comparative example in which the raised portions are low and the recessed portions are shallow (i.e., a center portion of the lens). No flat portion is provided in the comparative example.

Regarding the lens of the comparative example, the reflection coefficient with respect to visible light in the area where the raised portions are low and the recessed portions are shallow is less than about 1.4%. The reflection coefficient with respect to visible light having a long wavelength is particularly large. In the area where the raised portions are low and the recessed portions are shallow, the height of the raised portion and the depth of the raised portion are about 210 nm, and the height of the raised portion and the depth of the raised portion are less than 0.4 times the wavelength of a component of the visible light having a long wavelength. Thus, the reflection of the visible light is not sufficiently reduced. Although not shown, the reflection coefficient with respect to the visible light in the area where the raised portions are high and the recessed portions are deep (i.e., in the perimeter portion of the lens) was equal to or less than about 0.15%. As described above, in the comparative example, the antireflection effect is high in the area where the raised portions are high and the recessed portions are deep, but the antireflection effect is small in the area where the raised portions are low and the recessed portions are shallow.

On the other hand, in the example, the reflection coefficient could be maintained at about 0.1% in the area where the raised portions 21 are high and the recessed portions 22 are deep (i.e., in the perimeter portion of the lens) in the entire range of the visible light. This is because the height of the raised portion 21 and the depth of the recessed portion 22 are about 350 nm, which is sufficient with respect to the wavelength of the visible light. Further, the reflection coefficient could be maintained at equal to or less than about 0.15% in the area where the raised portions 21 are low and the recessed portions 22 are deep (i.e., in the center portion of the lens) in the entire range of the visible light. This is because of the interference effect between the first flat portion 16 of the raised portion 21 and the second flat portion 17 of the recessed portion 22, and the antireflection effect due to the interference effect. Thus, in the example, it is possible to increase the antireflection effect of the area where the raised portions 21 are low and the recessed portions 22 are shallow. Further, the antireflection effect of the area where the raised portions 21 are low and the recessed portions 22 are shallow can be equal to the antireflection effect of the area where the raised portions 21 are high and the recessed portions 22 are deep. This leads to a uniform and significant antireflection effect on the entire surface of the lens 11.

<<Second Embodiment>>

The second embodiment will be described below with reference to the drawings. The lens of the second embodiment is different from the lens of the first embodiment in the shape of the SWS provided on the optical surface. Differences between the second embodiment and the first embodiment will be mainly described below.

Figure 5:
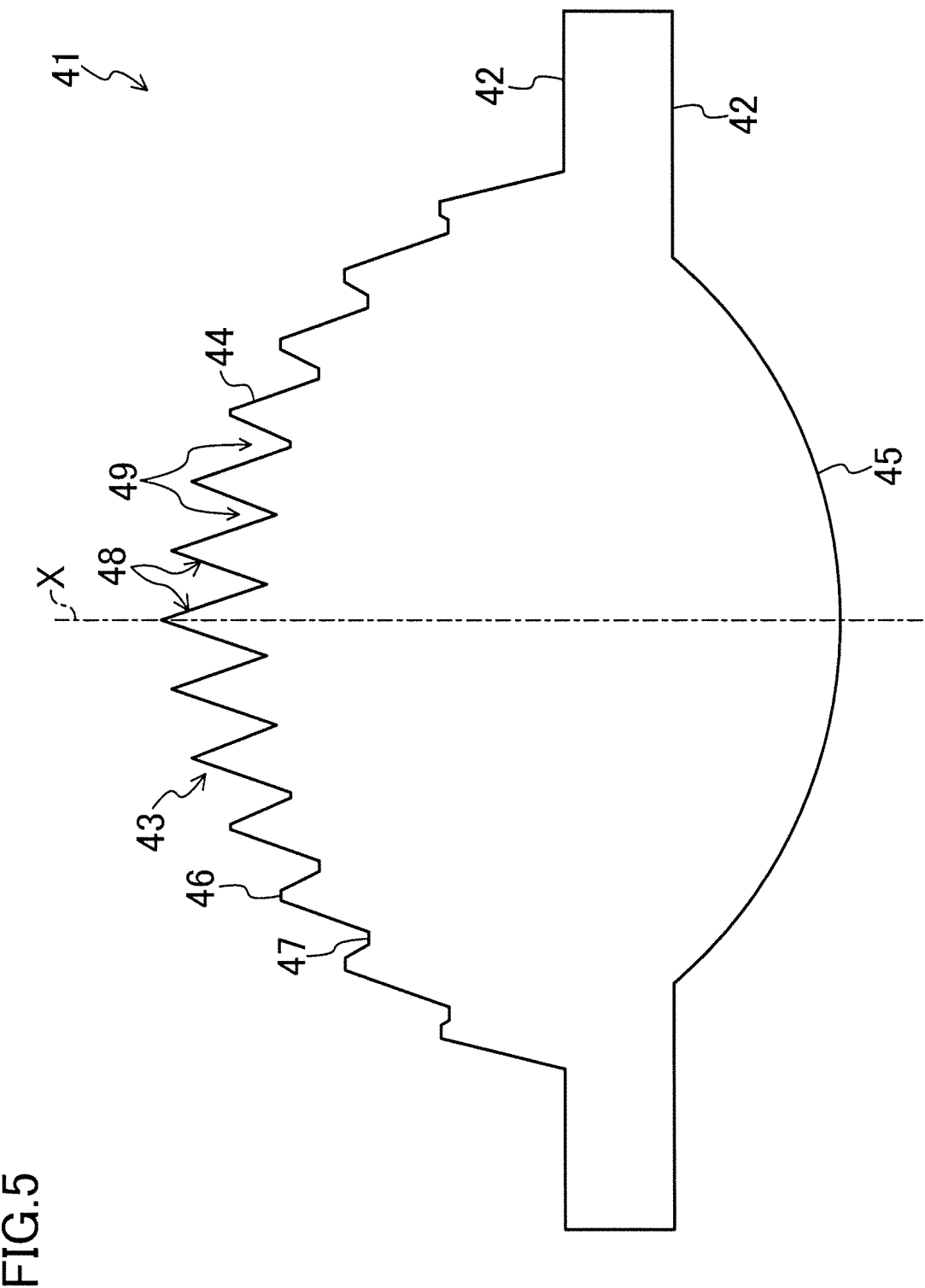
FIG. 5 is a cross section of a lens according to the second embodiment.

FIG. 5 is a cross section of a lens 41. The lens 41 includes a first optical surface 44, a second optical surface 45, and cut end surfaces 42. The first optical surface 44 is provided with an SWS 43. The SWS 43 includes a plurality of raised portions 48 and the recessed portions 49 which are alternately arranged. The heights of the raised portions 48 are relatively high, and the depths of the recessed portions 49 are relatively deep, in a center portion of the first optical surface 44. The heights of the raised portions 48 and the depths of the recessed portions 49 are reduced with decreasing distance between each of the raised portions 48 and the recessed portions 49 and a perimeter portion of the first optical surface 44. At the perimeter portion of the first optical surface 44, a first flat portion 46 is provided at a top portion of the raised portion 48, and a second flat portion 47 is provided at a bottom portion of the raised portion 49. Further, the areas of the first and second flat portions 46, 47 are increased with decreasing distance between each of the first and second flat portions 46, 47 and the perimeter portion of the first optical surface 44.

A method for forming the lens 41 is almost the same as the method for forming the lens 11 according to the first embodiment. In forming a lens mold for the lens 41, the resist dot pattern 34 shown in FIG. 3D is formed such that the diameter of a resist hole at the perimeter portion is larger than the diameter of a resist hole at the center portion. To adjust the diameter of the hole of the resist dot pattern 34, a dose amount (an exposure amount) of electron beam lithography may be changed, for example.

According to the present embodiment, the first and second flat portions 46, 47 are provided at the relatively low raised portion 48 and the relatively shallow raised portion 49. This means that in the area of the low raised portions 48 and the shallow recessed portions 49, the antireflection effect due to fine raised portions and recessed portions is small compared to the area of the high raised portions 48 and the deep recessed portions 49, but the antireflection effect due to interference effect can complement the small antireflection effect. As a result, the reflection coefficient of the entire first optical surface 44 with respect to visible light can be maintained at a small value as in the first embodiment.

Further, the perimeter portion of the first optical surface 44 is a portion at which the first optical surface 44 has the greatest inclination, and which is not easily released in the lens molding process. For example, in a lens having a large inclination angle, such as an objective lens capable of collecting blue light, the amount of deformation of a glass material during molding is increased with decreasing distance to the perimeter portion of the lens, and a load on the lens mold is increased with decreasing distance to the perimeter portion of the lens. Thus, the raised portions and the recessed portions of the lens are firmly engaged with the raised portions and the recessed portions of the lens mold at the perimeter portion of the lens, and it becomes difficult for the lens to be released from the lens mold. Further, the amount of contraction of the lens during a cooling step in the molding process is increased with decreasing distance to the perimeter portion. In this point, as well, the raised portions and the recessed portions of the lens are firmly engaged with the raised portions and the recessed portions of the lens mold at the perimeter portion of the lens, and it becomes difficult for the lens to be released from the lens mold. Particularly in the structure having a fine structure such as the SWS 43, it is more difficult to release the lens from the lens mold because the surface area is large. In contrast, according to the present embodiment, the raised portions 48 are low and the recessed portions 49 are shallow at the perimeter portion of the lens, and moreover, the first and second flat portions 46, 47 are provided. Therefore, it is possible to solve the above problems and easily perform molding. As a result, it is possible to achieve both the easiness in forming the lens and the increase in the antireflection effect.

<<Third Embodiment>>

The third embodiment will be described below with reference to the drawings. The lens of the third embodiment is different from the lenses in the first and second embodiments in the shape of the SWS formed on the optical surface. Differences between the third embodiment and the first and second embodiments will be mainly described below.

Figure 6:
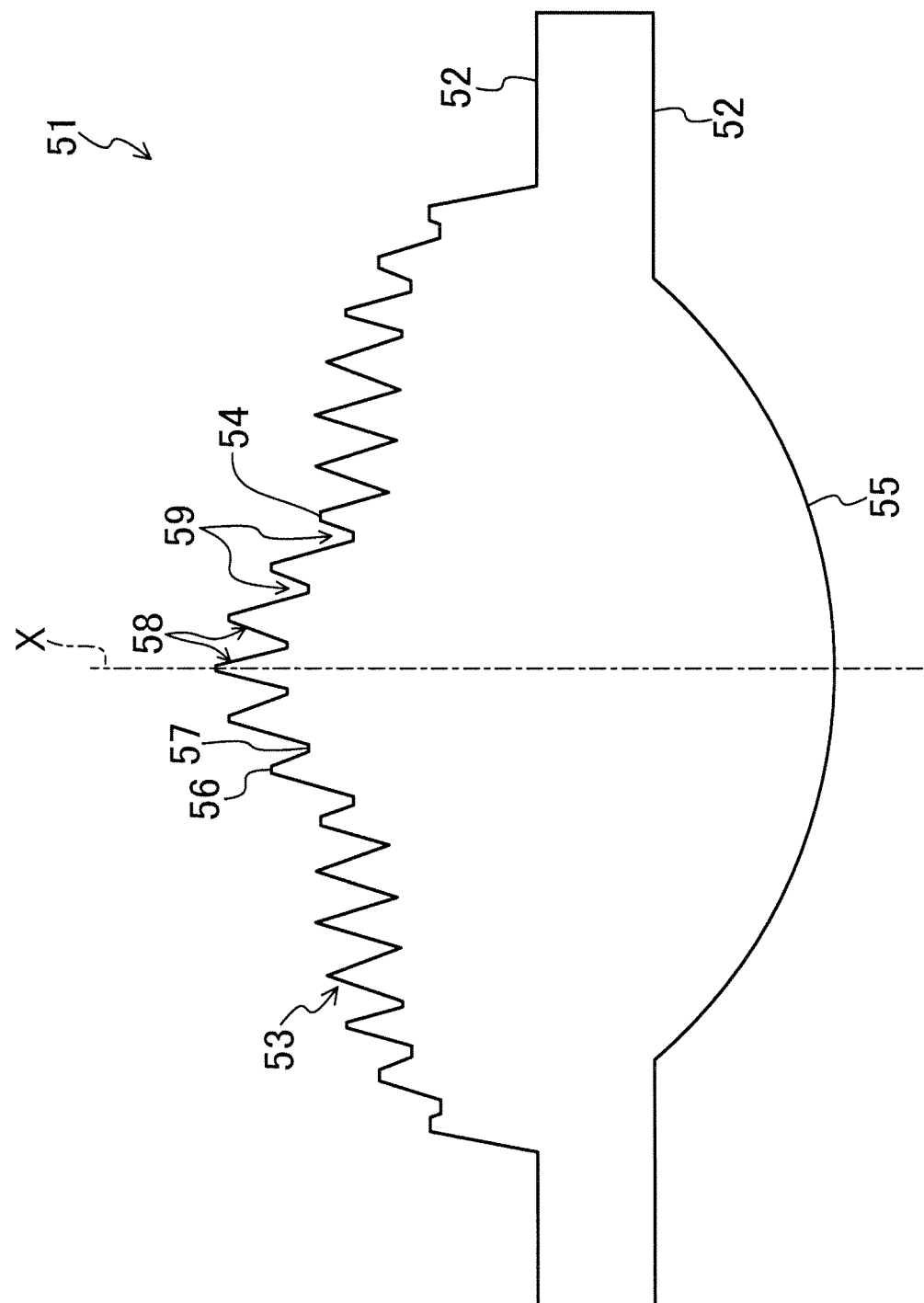
FIG. 6 is a cross section of a lens according to the third embodiment.

FIG. 6 is a cross section of a lens 51. The lens 51 includes a first optical surface 54, a second optical surface 55, and cut end surfaces 52. The first optical surface 54 is provided with an SWS 53. The SWS 53 includes a plurality of raised portions 58 and recessed portions 59 which are alternately arranged. The SWS 53 is formed such that the heights of the raised portions 58 and the depths of the recessed portions 59 are not uniform across the first optical surface 54, but vary according to locations. Further, the heights of the raised portions 58 and the depths of the recessed portions 59 do not vary monotonically in a radial direction of the first optical surface 54, but is increased or decreased.

Specifically, the first optical surface 54 includes a base surface 61 shown in FIG. 7. The base surface 61 includes areas A-E. The areas A and E are located at outermost portions of the base surface 61, and have large inclination angles with respect to the optical axis X (hereinafter simply referred to as an "inclination angle"). The area C is located at a center portion of the base surface 61, and includes a central portion having a gentle inclination angle and a peripheral portion surrounding the central portion and having a sharp inclination angle. The area B is located between the area A and the area C, and has a substantially horizontal portion having a gentle inclination angle. The area D is located between the area E and the area C, and has a substantially horizontal portion having a gentle inclination angle.

Since the inclination angles are large in the areas A and E, the raised portions 58 are made low and the recessed portions 59 are made shallow. Since the inclination angles are small in the areas B and D, the raised portions 58 are made high and the recessed portions 59 are made deep. The inclination angle is small in the area C, but the raised portions 58 are made low and the recessed portions 59 are made shallow in terms of the easiness in forming a mold and the easiness in forming the lens by molding. In the areas A, C and E where the raised portions 58 are low and the recessed portions 59 are shallow, a first flat portion 56 is provided at a top portion of the raised portion 58, and a second flat portion 57 is provided at a bottom portion of the raised portion 59.

In the above configuration, it is possible to increase the antireflection effect due to the interference effect, even in the areas where the raised portions 58 are low and the recessed portions 59 are shallow. As a result, the reflection coefficient of the entire first optical surface 54 with respect to visible light can be maintained at a small value as in the first and second embodiments. Moreover, it is possible to easily release the lens from the lens mold during the molding also in the areas such as areas A and E where the inclination angle is large, without a reduction in the antireflection effect. Further, it is possible to increase the easiness in forming the lens also in the areas such as the area C for which it is requested to increase the easiness in forming the SWS 13 regardless of the inclination angles, without a reduction in the antireflection effect. Furthermore, in the areas such as the areas B and D where the heights and depths of the SWS 13 do not have to be reduced, the raised portions 58 are made high and the recessed portions 59 are made deep to obtain significant antireflection effect.

The lens mold for forming a structure such as the SWS 53 can be obtained by adjusting the diameters of the holes of the resist dot pattern 34 as in the second embodiment.

As described in the first to third embodiments, the heights of the raised portions and the depths of the recessed portions are changed according to the lens shape (e.g., the inclination angle) and portions of the lens (e.g., the center portion and the perimeter portion). As a result, the mold can be easily formed and a molding process (in particular, a step of releasing the mold) can be easily performed. Further, flat portions are provided at the top portion of the raised portion and the bottom portion of the raised portion in the area where the raised portions are relatively low and the recessed portions are relatively shallow, thereby making it possible to increase the antireflection effect. Accordingly, although there are cases in which the raised portions need to be low and the recessed portions need to be shallow for various reasons, it is possible to reduce degradation of the antireflection effect even in such cases. As a result, it is possible to obtain a lens having a significant antireflection effect on the entire optical surface.

<<Other Embodiments>>

The following structures may be used in the above embodiments.

The method for forming a lens and the method for forming a lens mold are not limited to the methods disclosed in the above embodiments.

For example, the material for the mold base may be a high-strength material in which a fine pattern can be easily formed by etching. For example, quartz (SiO$_2$), silicon carbide (SiC), silicon (Si), glassy carbon (C), hard metal (WC), etc., may be used.

As a material for the metal mask, Cr, Ta, WSi, Ni, W, etc., may be used.

In the above embodiments, electron beam lithography is used to form the lens mold, but the present disclosure is not limited to the electron beam lithography. Interference exposure (hologram exposure), lithography such as X-ray lithography, etc., may also be used. Further, a nanoimprint technique or a particle configuration method may be used to form the mask.

In the case where the lens mold is used to form the lens, it is preferable to perform a release treatment on the molding surface of the mold before molding. In the case of glass molding, a thin film made of carbon, boron nitride, DLC, or a noble metal (i.e., an alloy which includes at least one or more of platinum (Pt), palladium (Pd), iridium (Ir), rhodium (Rh), osmium (Os), ruthenium (Ru), rhenium (Re), tungsten (W), and tantalum (Ta)) may be formed on the molding surface. In the case of resin molding, a fluorine based mold release agent may be applied to the molding surface. The provision of such a release treatment enables the molded object to be released more easily.

The structure of the lens is not limited to the structures described in the above embodiments.

For example, a convex lens was described in the above embodiments, but a concave lens may also be used.

Moreover, the optical component in which the SWS is formed is not limited to a lens. The SWS having the above structure may be applied to a display surface, an inner circumferential surface of a barrel, a prism, etc. The base surface in which the SWS 13 is formed may be flat.

In the above embodiments, the SWS is formed only on the surface of the first optical surface, but the present disclosure is not limited to this structure. The SWS may be formed on both of the first optical surface and the second optical surface, or may be formed on only the second optical surface.

In the above embodiment, the raised portions are cone-shaped, and the recessed portions are funnel-shaped, but the present disclosure is not limited to these structures. For example, the raised portions may be in a pyramid shape, such as a four-sided pyramid, a three-sided pyramid, etc., and the recessed portions may be in an inverted shape of these pyramid shapes. Further, the raised portions and the recessed portions are not limited to a cone shape or an inverted cone shape, but may be any shapes. The raised portions may be linear raised portions extending in a circumferential direction about the optical axis X, and the recessed portions may be linear recessed portions extending in the circumferential direction about the optical axis X. In this case, the widths of the flat portions provided at the top portion of the raised portion and the bottom portion of the raised portion in a radial direction from the optical axis X are increased as the raised portion becomes lower, and the recessed portions becomes shallower.

The present disclosure is not limited to the above-described embodiments, and can be modified in various ways unless otherwise deviated from the spirits and the features of the present disclosure. The above-described embodiments have been set forth merely for the purposes of preferred examples in nature, and are not intended to limit the scope, applications, and use of the present disclosure. The scope of the present disclosure is described by the claims, and is not limited by the specification. Deformations and modifications belonging to a range equivalent to the range of the claims are within the scope of the present disclosure.

The optical component according to the present disclosure has an antireflection effect and high environmental resistance, and is useful as a lens barrel, and an optical element represented by a lens, etc. By using the optical component according to the present disclosure, it is possible to achieve various types of high-definition optical systems, such as an imaging optical system, an objective optical system, a scanning optical system, a pickup optical system, etc., various types of optical units, such as a lens barrel unit, an optical pickup unit, an imaging unit, etc., and an imaging device, an optical pickup device, an optical scanning device, etc.

What is claimed is:

1. An optical component, comprising:
an antireflection structure in which a plurality of raised portions and recessed portions are arranged, and which reduces reflection of light whose wavelength is equal to or greater than a cycle of the raised portions and a cycle of the recessed portions, wherein
the antireflection structure includes an area where a height of each of the raised portions is relatively low and a depth of each of the recessed portions is relatively shallow, and an area where a height of each of the raised portions is relatively high and a depth of each of the recessed portions is relatively deep,
in the area where the height of each of the raised portions is relatively low and the depth of each of the recessed portions is relatively shallow, a first flat surface is provided at a top portion of each of the raised portions and a second flat surface is provided at a bottom portion of each of the recessed portions, and an area of each of the first flat surface and the second flat surface is increased as the height of each of the raised portions is reduced or as the depth of each of the recessed portions is reduced.

2. The optical component of claim 1, wherein
the antireflection structure is formed on a curved surface,
a perimeter portion of the curved surface has a greater inclination than a center portion of the curved surface, and
the height of each of the raised portions at the perimeter portion of the curved surface is lower than the height of each of the raised portions at the center portion of the curved surface, and the depth of each of the recessed portions at the perimeter portion of the curved surface is shallower than the depth of each of the recessed portions at the center portion of the curved surface.

3. The optical component of claim 2, wherein
the raised portions are arranged in a descending order of height from the center portion of the curved surface toward the perimeter portion of the curved surface, and
the recessed portions are arranged in a descending order of depth from the center portion of the curved surface to the perimeter portion of the curved surface.

4. The optical component of claim 1, wherein
the antireflection structure is formed on a curved surface,
a perimeter portion of the curved surface has a greater inclination than a center portion of the curved surface, and
the height of each of the raised portions at the center portion of the curved surface is lower than the height of each of the raised portions at the perimeter portion of the curved surface, and the depth of each of the recessed portions at the center portion of the curved surface is shallower than the depth of each of the recessed portions at the perimeter portion of the curved surface.

5. The optical component of claim 4, wherein
the raised portions are arranged in a descending order of height from the perimeter portion of the curved surface to the center portion of the curved surface, and
the recessed portions are arranged in a descending order of depth from the perimeter portion of the curved surface to the center portion of the curved surface.

6. The optical component of claim 1, wherein
the area where the height of each of the raised portions is relatively low and the depth of each of the recessed portions is relatively shallow, and the area where the height of each of the raised portions is relatively high and the depth of each of the recessed portions is relatively deep are alternately arranged.

7. The optical component of claim 1, wherein the height of the raised portions and the depth of the recessed portions are 0.4 times or more the wavelength of the light.

* * * * *